United States Patent [19]

Albright

[11] Patent Number: 5,733,089

[45] Date of Patent: Mar. 31, 1998

[54] NOSEPIECE/RECEIVER FOR AUTOMATED FASTENER SYSTEM

[75] Inventor: Clare E. Albright, Roscommon, Mich.

[73] Assignee: Air Way Automation, Inc., Grayling, Mich.

[21] Appl. No.: 539,365

[22] Filed: Oct. 5, 1995

[51] Int. Cl.$^6$ ............................................. B25C 1/04

[52] U.S. Cl. ........................ 414/222; 294/108; 221/310; 227/123

[58] Field of Search .................... 221/267, 310, 221/297; 227/120, 123, 134; 269/276; 414/783, 222; 294/106, 65.5

[56] References Cited

U.S. PATENT DOCUMENTS

| | | | |
|---|---|---|---|
| 3,065,960 | 11/1962 | Miller | 269/276 |
| 3,700,139 | 10/1972 | Kelly | 221/267 |
| 3,957,192 | 5/1976 | Fehrs | 227/123 |
| 4,467,952 | 8/1984 | Morrell, Jr. | 227/123 |
| 4,969,582 | 11/1990 | Gauger | 221/267 |
| 5,069,362 | 12/1991 | Albright . | |

*Primary Examiner*—Karen B. Merritt
*Assistant Examiner*—Gregory A. Morse
*Attorney, Agent, or Firm*—Harness, Dickey & Pierce, P.L.C.

[57] ABSTRACT

In a nosepiece/receiver assembly having a housing for receiving a part, a removable jaw mechanism that is mounted for pivotable movement against a biasing spring. The jaw member has a contoured surface for holding a part received by the nosepiece/receiver assembly when the jaw member is in a part holding position. The jaw member includes channel at one end for enabling the jaw member to pivot about a securing member of the assembly to a part releasing position. The jaw member may consist of either two cooperating movable jaws or one separate jaw. The jaw mechanism also includes a resilient biasing device for urging the jaw member into a part holding position. The biasing device is in contact with both the housing of the nosepiece/receiver assembly and the jaw member, with at least a portion of the resilient biasing device being external to the jaw member to allow easy replacement of the biasing device. The biasing device is positioned to minimize the chance of breakage of the jaw.

22 Claims, 6 Drawing Sheets

NOSEPIECE/RECEIVER FOR AUTOMATED FASTENER SYSTEM

BACKGROUND OF THE INVENTION

The present invention relates generally to automated fastener feed systems, and particularly to a nosepiece/receiver jaw and spring designed for ease of maintenance and for minimizing the chance of breakage.

Automated fastener feed systems are well known and have numerous manufacturing applications. Such systems commonly consist of a bulk hopper storage, an elevate and orient device, an escape and blow device and a nosepiece/receiver. A typical escape and blow device is disclosed in U.S. Pat. No. 5,069,362 entitled "Escapement Manifold For Fastener Feeding Machines And The Like", which is assigned to the assignee of the present invention and incorporated herein by reference. Such an automated fastener feed system delivers oriented bolts, screws or other fasteners to a work station for subsequent assembly to a workpiece. Fasteners are typically delivered to the nosepiece/receiver through flexible urethane tubing via air pressure or occasionally by gravity.

The same basic nosepiece/receiver technology has been utilized for years. A typical nosepiece/receiver includes one or two pivotable jaw members which receive a fastener supplied from the escape and blow device when the jaw member is in a closed part holding position. The jaw member is urged to a part holding position by a spring or springs disposed at the far end of the jaw member. The jaw member is subsequently pivoted to an open part releasing position. After the jaw member is pivoted to release the fastener, the springs urge the jaw member back to the initial closed position.

While such assemblies exhibit time tested performance, there still remains areas where technological advancement would be desirable. For example, in a conventional nosepiece/receiver, internally mounted jaw member springs will eventually exhibit some spring fatigue after repeated opening and closing of the jaw. These internally mounted springs are typically mounted such that an Allen wrench or other similar tool is required to remove the jaw member to access and replace the springs. As such, relatively skilled labor and system down time are required to replace the fatigued springs.

Also, if the nosepiece/receiver becomes jammed, a jaw member could break at its pivot point due to the additional outward rotational force applied to the jaw member. Such jaw members are costly to replace, and breakage could result in unwanted assembly down time.

Further, commercially available jaw members in present nosepiece/receivers are typically biased by two springs located against the inner surface of the jaw member hinges. Also, the springs must be positioned some distance from the jaw pivot to be effective. As such, the nosepiece/receiver must be of a sufficient width and length to allow spring pockets to be formed in the jaw hinge inner surfaces to maintain the springs in proper position. This added width and length increases the cost, size and weight of the jaw members.

Therefore, it would be desirable to provide a nosepiece/receiver which allows easy access to jaw biasing springs, minimizes the possibility of jaw member breakage, and facilitates a minimal jaw member width and length.

Accordingly, it is a principle objective of the present invention to provide a unique quick change nosepiece/receiver jaw that is designed for ease of replacement and maintenance of the jaw and the nosepiece/receiver springs.

It is another objective of the present invention to provide a quick change nosepiece/receiver jaw that minimizes the possibility of jaw breakage.

It is further objective of the present invention to provide a quick change nosepiece/receiver jaw that requires no tools in order to replace worn nosepiece/receiver springs.

It is another objective of the present invention to provide a nosepiece/receiver for use in an automated fastener system in which the size of the jaw member is minimized, thus decreasing cost, size and weight.

It is yet another objective of the present invention to provide a quick change nosepiece/receiver jaw that may be used as a retrofit replacement on existing nosepiece/receivers from a variety of manufacturers.

SUMMARY OF THE INVENTION

To achieve the foregoing objectives, the present invention provides a quick change jaw for receiving and holding a part and a biasing device for urging the jaw toward a part holding position. The quick change jaw is removably mounted to a nosepiece/receiver assembly for pivotable movement, and is pivotably removable from the pivot device upon removal of the biasing device.

The quick change jaw includes at least one jaw member having a contoured surface for holding a part received by the nosepiece/receiver assembly when the jaw member is in a part holding position. The jaw member also includes a U-shaped channel at one end for enabling the jaw member to pivot about a securing member of the assembly to a part releasing position.

The quick change jaw also includes a resilient biasing device for urging the jaw member into a part holding position. The biasing device is in contact with both the housing of the nosepiece/receiver assembly and the jaw member, with at least a portion of the resilient biasing device being external to the jaw. The biasing device minimizes the risk of breakage of the jaw as the biasing device, rather than the jaw, breaks if the jaw is pivoted too far outwardly.

More particularly, the biasing device comprises a spring extending beneath the pivot point of the jaw, such as a leaf spring or round wire spring. The spring is deflectable between first and second positions corresponding to the open (part releasing) and closed (part holding) positions of the jaw.

More particularly, the jaw includes a passageway for enabling the resilient biasing device to be inserted through a section of the jaw in order to contact the nosepiece/receiver housing. The biasing device comprises a spring which is readily accessible for maintenance purposes without requiring the assistance of tools and skilled maintenance personnel.

Additional features and advantages of the present invention will become more fully apparent from a reading of the detailed description of the preferred embodiment in the accompanying drawings in which:

3

DETAILED DESCRIPTION OF THE PREFERRED EMBODIMENTS

The following description of the preferred embodiments is merely exemplary in nature and is no way intended to limit the invention or its application or uses.

Figure 1:
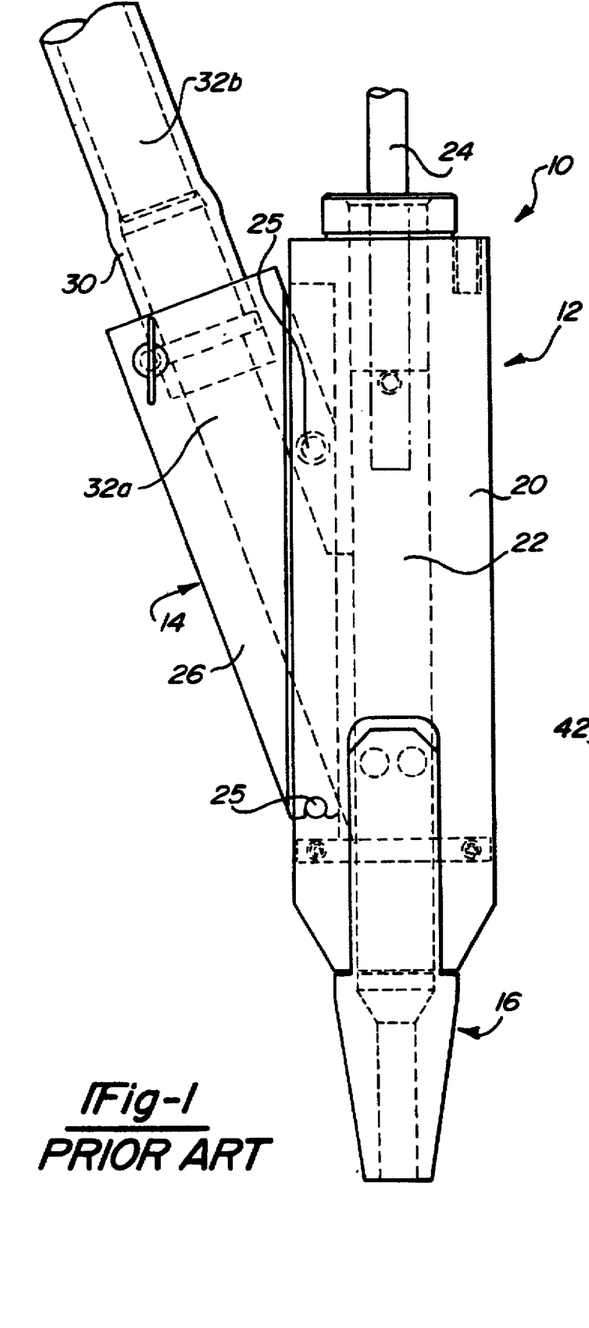
FIG. 1 is a front elevational view of a conventional prior art nosepiece/receiver implementing a conventional double jaw design, shown in a closed position, and showing the inner components thereof in phantom.

Referring to the drawings, FIG. 1 shows a front elevational view of a double jaw nosepiece/receiver generally at 10 of the type well-known in the art. The double jaw nosepiece/receiver 10 receives a fastener (not shown), such as a hex bolt, from a remote supply bin, positions the fastener, and then places or secures the fastener to a workpiece. Such a nosepiece/receiver is particularly suited for use in automobile assembly lines and other automated work station applications.

The term "fastener" is used in this document to define a bolt, a screw, a nut, a dowel, a rivet, or any fed part delivered by air pressure or by gravity to a nosepiece/receiver. Also, it should be understood that a fastener supplied to the nosepiece/receiver of the present invention may be fastened to, place on, or pressed into a workpiece, depending upon the type of fastener used and the particular application.

The nosepiece/receiver 10 is composed of three main subassemblies: a nosepiece/receiver body, shown generally at 12; a nosepiece/receiver entrance block, shown generally at 14; and a nosepiece/receiver jaw subassembly, shown generally at 16. The nosepiece/receiver body 12 includes a main body 20 having a cylindrical bore 22 extending through its center. A drive mechanism extension, shown in part at 24, is controllably inserted through the bore 22, through manipulation of automated control circuitry (not shown), and includes either a bit or a socket or placement rod (not shown) to drive or place a fastener in a manner well-known to those skilled in the art.

The term nosepiece/receiver is used throughout the specification in reference to the assembly shown generally at 10. However, it should be appreciated that the nosepiece/ receiver is also commonly referred to as a nosepiece, a receiver, a chuck or a gun.

The nosepiece/receiver entrance block 14 is operatively connected to the body 20 of the nosepiece/receiver body 12 by fastening mechanisms 25. The nosepiece/receiver entrance block includes an entry block 26 into which an entry tube 30 is operatively inserted. The entry block 26 and the entry tube 30 have communicating bores 32a and 32b. A fastener is fed into the entry tube 30 from a remote fastener storage bin (not shown) and through bores 32a and 32b. The bore 32a of the entry block 26 is in communication with the bore 22 of the nosepiece/receiver. Thus, a fastener that is fed into the entry tube 32a is channeled into the bore 22 and is subsequently received and positioned by the jaw subassembly 16.

Figure 2:
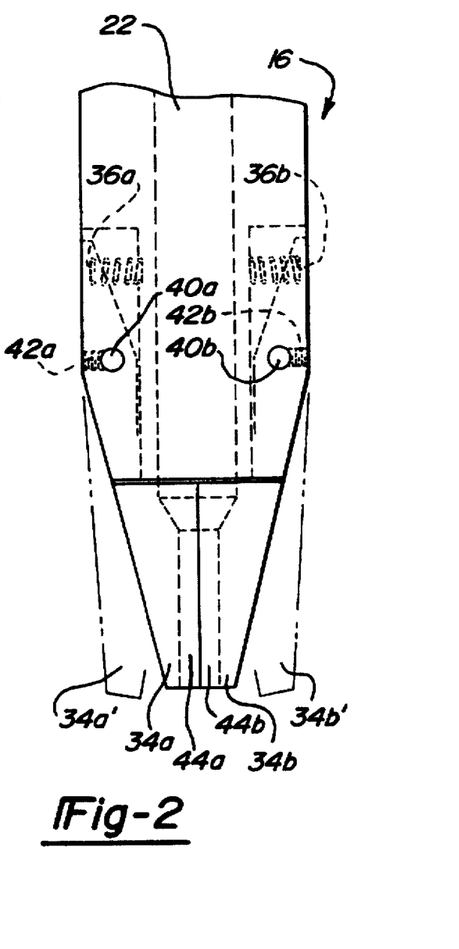
FIG. 2 is a front elevational view of the nosepiece/receiver of FIG. 1, showing the jaws in phantom in an open position.

Referring to FIG. 2, the jaw subassembly 16 of FIG. 1 is shown in more detail. The subassembly 16 includes fastener positioning jaws, which are shown both in a part holding position at 34a, 34b and also in phantom in a part releasing position at 34a', 34b'. The jaws 34a, 34b are each formed to include inner contoured surfaces 44a, 44b. The jaws 34a, 34b are biased to a default part holding position by internal coil springs 36a, 36b. The jaws 34a, 34b are pivotably connected to the body 20 by dowels 40a, 40b held in position in bores in the body 20 by set screws 42a, 42b. The inner contoured surfaces 44a, 44b receive and position the fastener to be secured to a workpiece by the drive mechanism 24.

Figure 3:
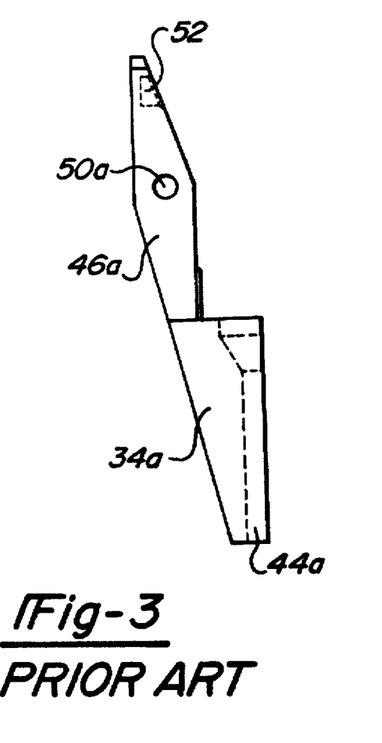
FIG. 3 is a front elevational view of a jaw of the nosepiece/receiver shown in FIG. 1.

Referring briefly to FIG. 3, the jaw 34a is shown in detail, with it being understood that the jaw 34b is formed so as to be a mirror image of the jaw 34a. As shown, the jaw 34a includes a jaw hinge 46a having an aperture 50a through which the dowel 40a is inserted for pivotally attaching the jaw 34a to the body 20 of the nosepiece/receiver. The jaw hinge further includes a spring bore 52 for receiving and positioning the internal spring 36a.

In operation, the nosepiece/receiver 10 receives a fastener to be placed or fastened to a workpiece from a remote fastener storage supply bin (not shown) through the entry tube 30. The fastener is typically blown through the bores of the entry tube 30 and the entry block 26 into the bore 22 of the nosepiece/receiver body 12. The fastener is then channelled down the bore 22 to the jaw subassembly 16. Next, the fastener is correctly positioned within the contoured surfaces 44a, 44b. Once in position within the contoured surfaces 44a, 44b, the drive mechanism extension 24 is moved through the bore 22 until the drive bit or socket or placement rod is moved into contact with the fastener. The drive mechanism extension 24, upon the bit or socket or placement rod contacting the fastener, forces the jaws 34a, 34b outwardly, allowing the fastener to be released from the nosepiece/receiver subassembly and positioned into the particular workpiece.

After the drive mechanism extension 24 (and associated bit or socket) places or secures the fastener on the workpiece, the components are withdrawn through the bore 22. Subsequent to the drive mechanism extension being withdrawn, the springs 36a, 36b apply an outward force to the jaw hinges 46a, 46b, thereby pivoting the jaw hinges 34a, 34b inwardly to a closed position for receiving and positioning a subsequently supplied fastener.

Figure 4:
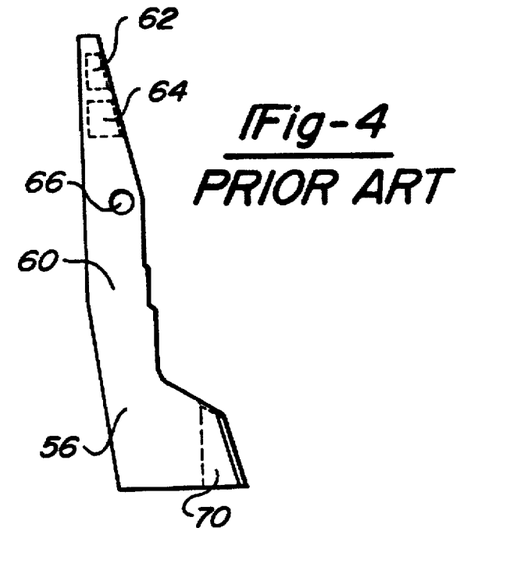
FIG. 4 is a front elevational view of a conventional prior art jaw from a single jaw nosepiece/receiver implemented in a conventional automated fastener system.

As with the above-described double jaw nosepiece/ receivers, the structure and operation of single jaw nosepiece/receiver systems are also well known in the art. Single jaw nosepiece/receivers are similar to double jaw nosepiece/receivers, with the exception being that the jaw subassembly includes only one jaw for receiving, positioning, and releasing a fastener. A typical jaw implemented in a single jaw nosepiece/receiver shown at 56 in FIG. 4. The single jaw includes a hinge portion 60 having spring bores 62 and 64. The spring bores 62 and 64 receive and position internal springs for biasing the jaw into a part holding position. The jaw 56 also includes a dowel aperture 66 through which a dowel (not shown) is inserted to pivotably secure the jaw to the body of the nosepiece/receiver. The jaw 56 also includes a contoured surface 70 that, in cooperation with the nosepiece/receiver, receives and positions a fastener supplied from a remote fastener storage bin. All other aspects of the single jaw nosepiece/receiver are similar to those of the double jaw nosepiece/receiver.

Figure 5:
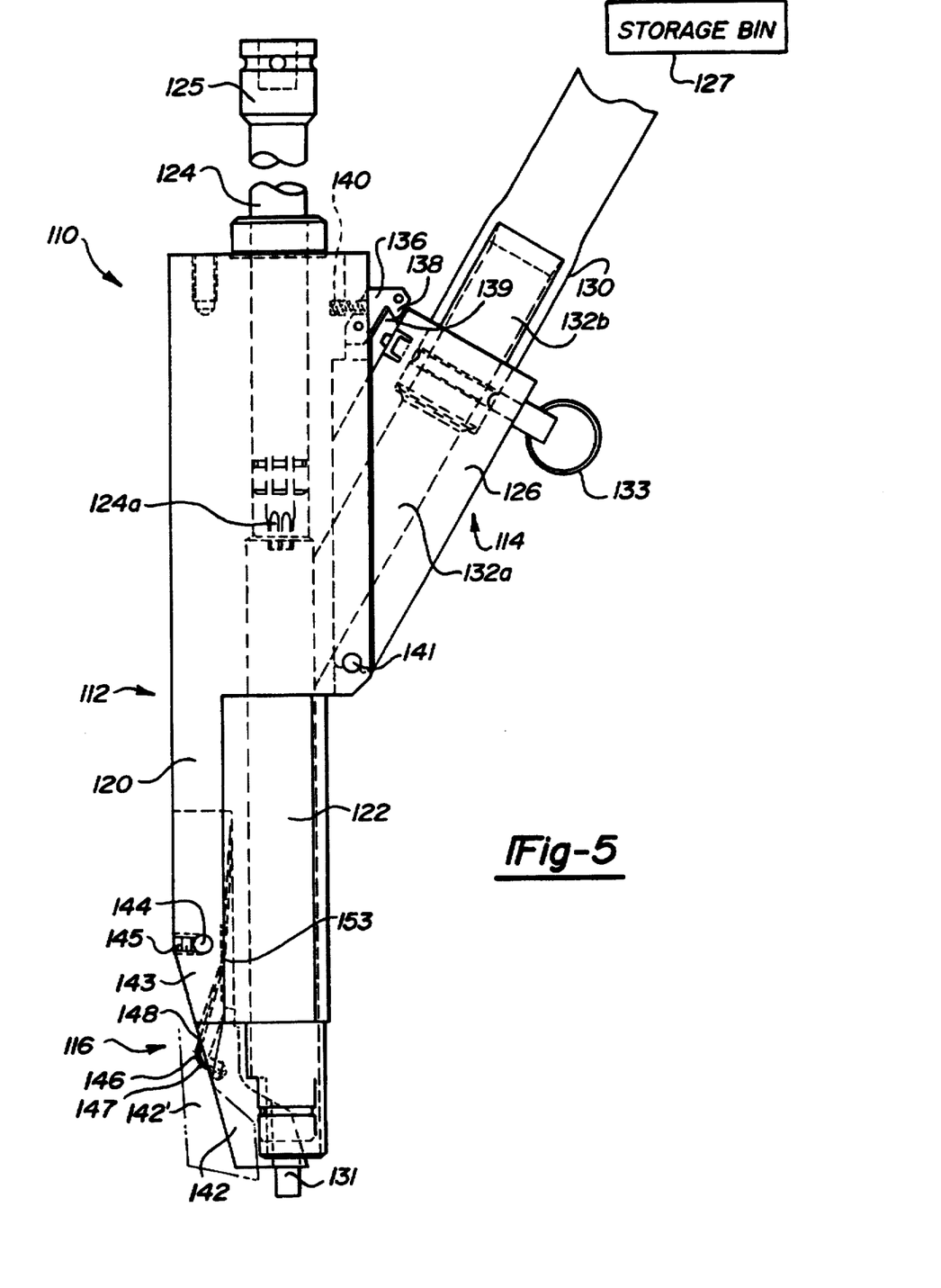
FIG. 5 is a front elevational view of a single jaw nosepiece/receiver according to a preferred embodiment of the present invention and showing the inner components thereof in phantom.

Turning now to FIG. 5, a single jaw nosepiece/receiver according to a preferred embodiment of the present invention is shown generally at 110. The single jaw nosepiece/ receiver, as with present single and double jaw nosepiece/ receivers, includes three main subassemblies: a nosepiece/ receiver body 112, a nosepiece/receiver entrance block 114 and a jaw subassembly 116. The nosepiece/receiver body 112 includes a body 120 having a channel bore 122 extending through its length. A drive extension 124 is positioned within the channel bore 122 and includes a bit (or socket) 124a to selectively engage a fastener 131 supplied to the system 110 from a remotely located fastener storage bin 127. Alternatively, upon engagement of the bit 124a with the fastener, the driver extension 124 drives, and thus tightens, the fastener to a workpiece (not shown).

The nosepiece/receiver entrance block 114 includes an entry block 126 in communication with an entry tube 130. The entry block 126 includes a bore 132a extending therethrough. The bore 132a is in communication with a bore 132b extending through the length of the entry tube 130. The entry tube 130 in turn is operatively connected to the remote fastener storage bin for receiving and supplying a fastener such as that shown at 131 to the system 110 in a manner that will be described in more detail below. The entry tube 130 is secured to the entry block 126 by a detent pin 133, such as a Carr Lane detent pin. The entry block 126 in turn is connected to the body 120 by a hinged arm 136 that includes a flange 138 for engaging a lip 139 of the entry block. The hinged arm 136 is biased outwardly from the body for engagement with the lip 139 by a spring 140 extending through a pocket in the body 120. The entry block 126 is also locked to the body 120 by a dowel 141. As shown in FIG. 5, the body 120 narrows in width below the intersection of the nosepiece/receiver entrance block and the body.

The jaw subassembly 116 includes a single jaw shown at 142 in a part holding position and in phantom at 142' in a part releasing position. The jaw is moved to the part releasing position as the drive bit 124a engages the fastener positioned within the jaw and pushes the fastener downwardly toward the workpiece to which the fastener is to be attached. With reference to all preferred embodiments of the present invention, when positioned in the part releasing position, the jaw is typically rotated outwardly 30°-45°, with 0° representing the part holding position. However, the part releasing position of the jaw (or jaws) may vary according to the fastener size and the particular application. The jaw 142 includes a jaw hinge 143 that pivotably connects the jaw to the body 120 about a dowel 144 in a manner described in more detail below. The dowel 144 is secured in position by a set screw 145. The jaw 142 is biased into a part holding position by an external quick change jaw spring 146 having a lower portion 147 and an upper portion 148.

Figure 6:
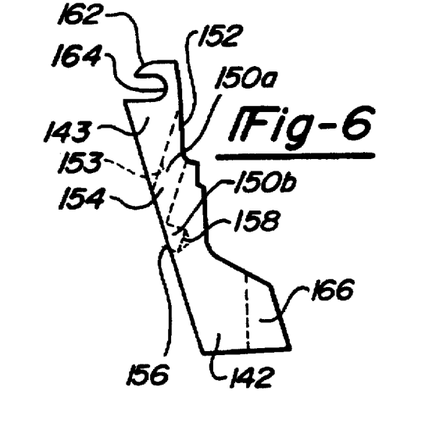
FIG. 6 is a front elevational view of the quick change jaw shown in FIG. 5.
Figure 7:
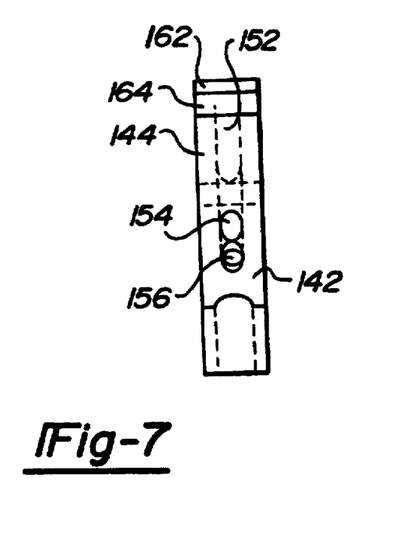
FIG. 7 is a side elevational view of the quick change jaw shown in FIG. 6.
Figure 8:
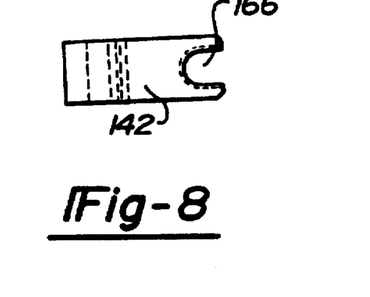
FIG. 8 is a top view of the quick change jaw shown in FIG. 6.

Referring to FIGS. 6–8, the jaw 142 of the single jaw nosepiece/receiver 110 is shown in detail. The jaw 142 represents a considerable advance over prior nosepiece/ receiver jaws in that the unique jaw design is biased into a part holding position by the external quick change jaw spring 146. The external quick change jaw spring is accessible from the outside of the jaw. This accessibility eliminates the need in present nosepiece/receivers for entirely removing a jaw from a nosepiece/receiver body to access a jaw spring or springs, and the unique jaw design minimizes the possibility of breakage about the jaw pivot point.

It should be appreciated at this point that the quick change jaws in all embodiments of the present invention are preferably formed from either steel or any other type of metal typically used for such an application. However, it should be appreciated that the jaws may also be formed from any number of different materials, including but not limited to high density plastic, plexiglass or ceramic material.

The jaw 142 of the present invention also includes spring bores (or passageways if the jaw is formed from a material other than metal), shown generally at 150a and 150b, that receive and correctly position the external quick change jaw spring. The jaw spring bore 150a defines an inner aperture 152 through which an upper end of the spring extends and abuts an inner wall 153 of the body. Further, the spring bores 150a, 150b define an upper outer aperture 154 and a lower outer aperture 156, respectively. As shown in FIG. 5, the upper spring portion 148 protrudes from the upper outer aperture 154 and the lower spring portion 147 is cantilevered in the spring bore 150b and protrudes from the lower outer aperture 156. The lower spring portion 147 is seated in a conical shaped seat 158 formed at the end of the lower part of the spring bore 150b.

The quick change jaw of the present invention also includes a jaw flange 162 at its upper end. The jaw flange 162, together in combination with the jaw hinge 143, defines a U-shaped slot 164 that receives the dowel 140, thereby pivotably connecting the jaw with the body of the nosepiece/ receiver 12. This design enables the quick change jaw 142, upon removal of the quick change jaw spring 148, to be pivoted outwardly around the dowel to a position extending above the horizontal. In a preferred embodiment of the present invention, the jaw is capable of pivoting almost completely around the dowel. However, in order to remove the jaw 142 from the body 120, the jaw need only be pivoted/rotated a degree or two beyond 90° where 0° represents the jaw closed position. Nevertheless, it should be appreciated that the U-shaped end of the jaw could be modified such that fewer, or more, degrees of rotation would be needed to remove the jaw from the body.

Figure 9:
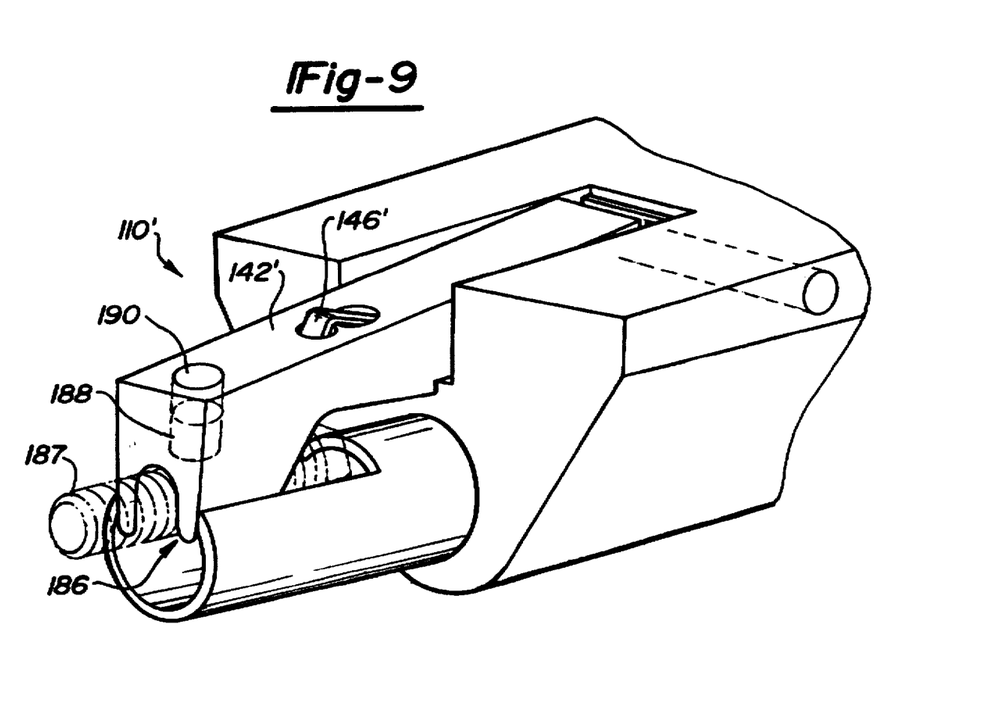
FIG. 9 is a perspective view of a single jaw nosepiece/ receiver according to another preferred embodiment of the present invention.
Figure 10:
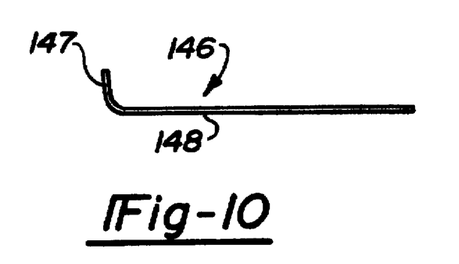
FIG. 10 is an elevational view of a quick change jaw spring in accordance with the present invention.
Figure 11:
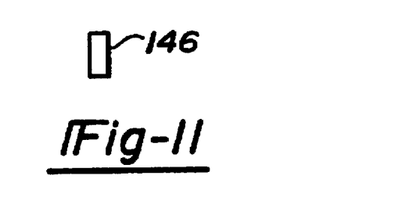
FIG. 11 is an end view of the quick change jaw spring shown in FIG. 10.
Figure 12:
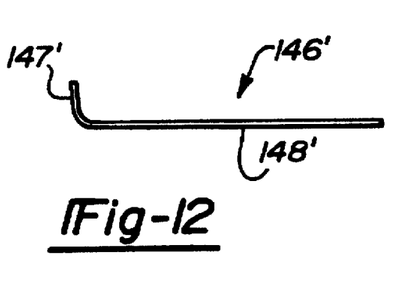
FIG. 12 is an elevational view of a second alternate quick change jaw spring in accordance with the present invention.
Figure 13:
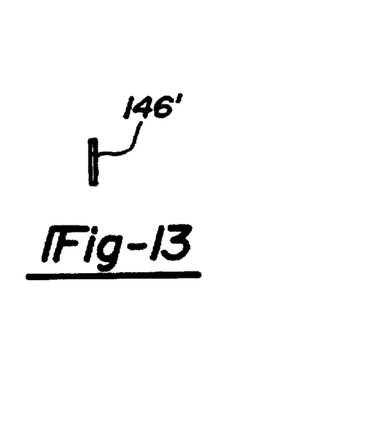
FIG. 13 is an end view of the quick change jaw spring shown in FIG. 12.

Referring to FIG. 9, a single jaw nosepiece/receiver according to another preferred embodiment of the present invention is shown generally at 110'. The nosepiece/receiver includes a single jaw 142' and associated jaw spring 146' similar to the jaw 142 and jaw spring 146' shown in FIG. 5. As with jaws in conventional single jaw nosepiece/receiver systems, the jaw 142' is movable between a closed, part holding position and an open, part releasing position. When the jaw is moved into a part holding position, the jaw defines a contoured part holding inner surface 186. The part holding inner surface 186 holds a fastener 187, supplied from a remote fastener supply (not shown), for positioning to and/or fastening to a workpiece. In addition, the nosepiece/receiver 110' also includes a permanent magnet 188 mounted within a bore 190 in the jaw 142' or otherwise positioned in close proximity with the contoured surface 186. The magnet interacts with a supplied metal fastener (through the attraction of a magnetic field) to correctly orient the fastener before the fastener is released and positioned to or fastened to a workpiece. While other types of devices may be employed to exert an attractive force (or repelling force from the opposite direction), a permanent magnet provides a simple, inexpensive and highly effective technique for this application.

The nosepiece/receiver 110' represents a significant improvement over prior art single jaw nosepiece/receivers in that the positioning magnet 188 permits the assembly to be oriented horizontally, as shown in FIG. 9, as well as vertically, for correct positioning of a supplied fastener. When single jaw nosepiece/receivers are applied horizontally, design restrictions sometimes require the jaw to open in a vertical or near vertical upward direction or motion. It is difficult to orient conventional single jaw fastener assemblies horizontally due to the fact that gravity causes the protruding fastener end to be projected downwardly. This downward projection of the fastener subsequently hinders correct positioning of the fastener to a workpiece, as the fastener must typically be inserted into a substantially horizontally-oriented bore formed in the workpiece. It is contemplated that, due to the positioning magnet 188, the nosepiece/receiver 110' may also be oriented in positions other than the horizontal or vertical, depending upon the particular application and the particular type of fastener supply system used.

Referring now to FIGS. 10-13, two alternative embodiments of the quick change jaw spring implemented in the present invention are shown at 146 and 146'. In a first embodiment shown in FIGS. 10 and 11, a quick change jaw spring is shown that is generally rectangular in cross-section. In a second embodiment, shown in FIGS. 12 and 13, a quick change spring 146' is shown that is thinner in diameter than the spring 146. In both embodiments, the spring is preferably formed from spring steel that is heat tempered at 1850° F. and oil quenched. The steel is then drawn to a desired temperature according to the particular parameters desired of the spring.

In addition to the above described embodiments, it should be appreciated that the quick change jaw springs may be flat leaf springs or round wire springs. The quick change jaw springs of the present invention may also be of various widths, thicknesses or diameters according to the particular application. It should also be appreciated that a fatigued spring is preferably removed from a quick change jaw by use of the replacement spring as the spring removal tool.

The spring, when positioned within the spring bores 150a, 150b as shown in FIG. 5, is deflectable between a first part holding jaw position and a second part releasing jaw position. If the jaw is pivoted too far outwardly, the quick change jaw spring of the present invention deforms and/or breaks. After the spring deforms or breaks, the jaw is capable of pivoting further outwardly around the dowel 144.

Jaws in conventional nosepiece/receivers, such as those shown in FIGS. 1-4, are more subject to damage because the jaw connection around the dowel or dowels permits only restrictive outward pivoting of the jaws in circumstances such as when a fastener becomes jammed in the nosepiece/receiver. Once the jaw reaches a certain minimal outward pivot distance, the jaw breaks at or near its pivot point or is damaged by further outward movement. The jaw flange 162 and the U-shaped slot 164 of the quick change jaw of the present invention allow a greater outward pivoting of the jaw, thereby subjecting the quick change jaw spring, and not the quick change jaw, to damage. This represents a considerable improvement in that the quick change jaw spring is far less expensive to replace than the quick change jaw itself.

Further, the quick change jaw of the present invention provides an advantage over prior nosepiece/receiver jaws in that when the jaw spring becomes fatigued, the quick change jaw itself need not be removed from the nosepiece/receiver in order to replace the spring. Rather, the spring 142, which is externally accessible, may be manually removed from the spring bores 150a, 150b and easily replaced with a new spring. Replacement of internal springs requires skilled labor and can result in significant tool downtime in presently available nosepiece/receivers because a jaw must be completely removed from the body in order to gain access to the internally located springs.

In addition, the size of the quick change jaw 142 of the present invention is minimized, as the need for spring bores located at the top of the jaw hinge is eliminated. Present jaw hinges must be thick enough to permit spring bores to be formed near the pivot point of the hinge. This requisite thickness causes the jaws to be larger and heavier. Because the need for spring bores near the top of the jaw hinge is eliminated in the quick change jaw of the present invention, the thickness, and therefore the weight of the jaw itself, is reduced.

It should also be appreciated that the quick change jaw of the present invention is designed to be retrofit on existing single jaw nosepiece/receivers. Therefore, the benefits and advantages associated with the present invention may be implemented in present nosepiece/receivers to provide the aforementioned advantages without the need to implement an entirely new nosepiece/receiver.

Figure 14:
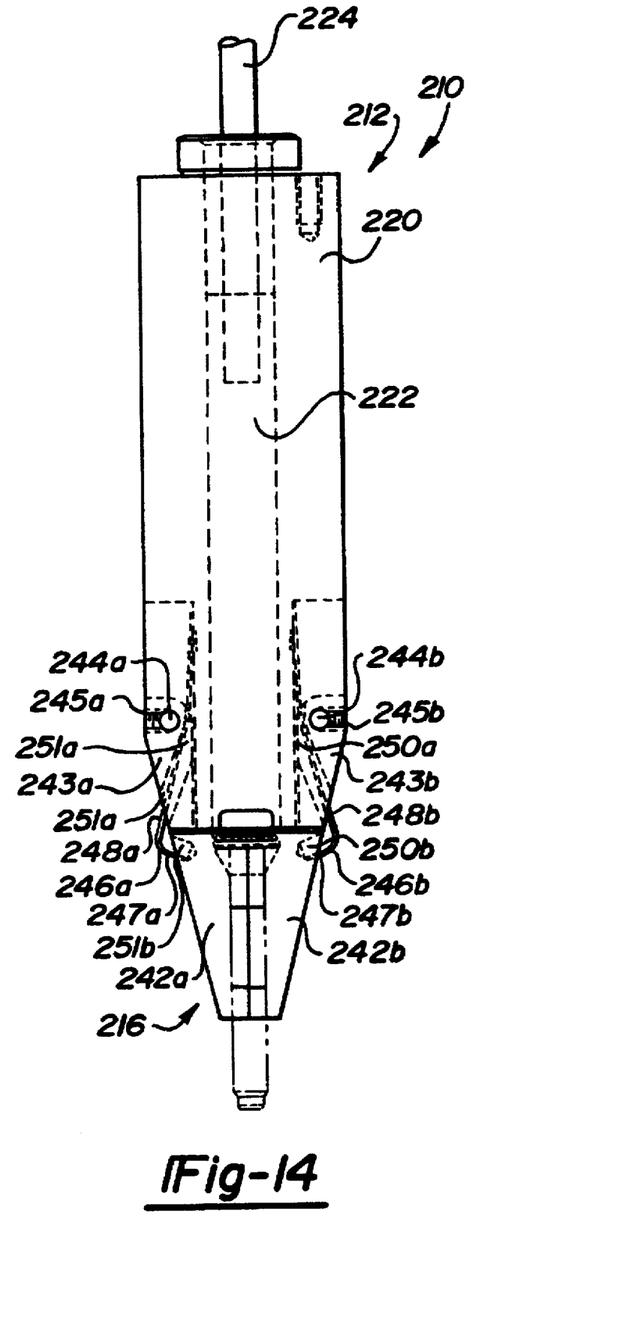
FIG. 14 is a front elevational view of a nosepiece/receiver implementing a two jaw nose design according to another preferred embodiment of the present invention and showing the inner components thereof in phantom, with the jaws each having an alternate configuration.

Turning now to FIG. 14, a double jaw nosepiece/receiver according to a second preferred embodiment of the present invention is shown generally at 210. The structure and operation of the nosepiece/receiver body 212 and the nosepiece/receiver entrance block 214 (FIG. 15) are similar to the single jaw nosepiece/receiver 110 of the present invention. The jaw subassembly 216 is also similar in structure and operation to the single jaw subassembly 116. However, the jaw subassembly 216 incorporates two quick change jaws 242a, 242b instead of the single jaw 142. Each jaw 242a, 242b includes a hinge 243a, 243b pivotably connected about dowels 244a, 244b. The dowels 244a, 244b are secured in bores in the body 220 by set screws 245a, 245b. Quick change jaw springs 246a, 246b are identical in structure and function to the single quick change jaw spring 146 of the single jaw fastener feed system 110.

Figure 15:
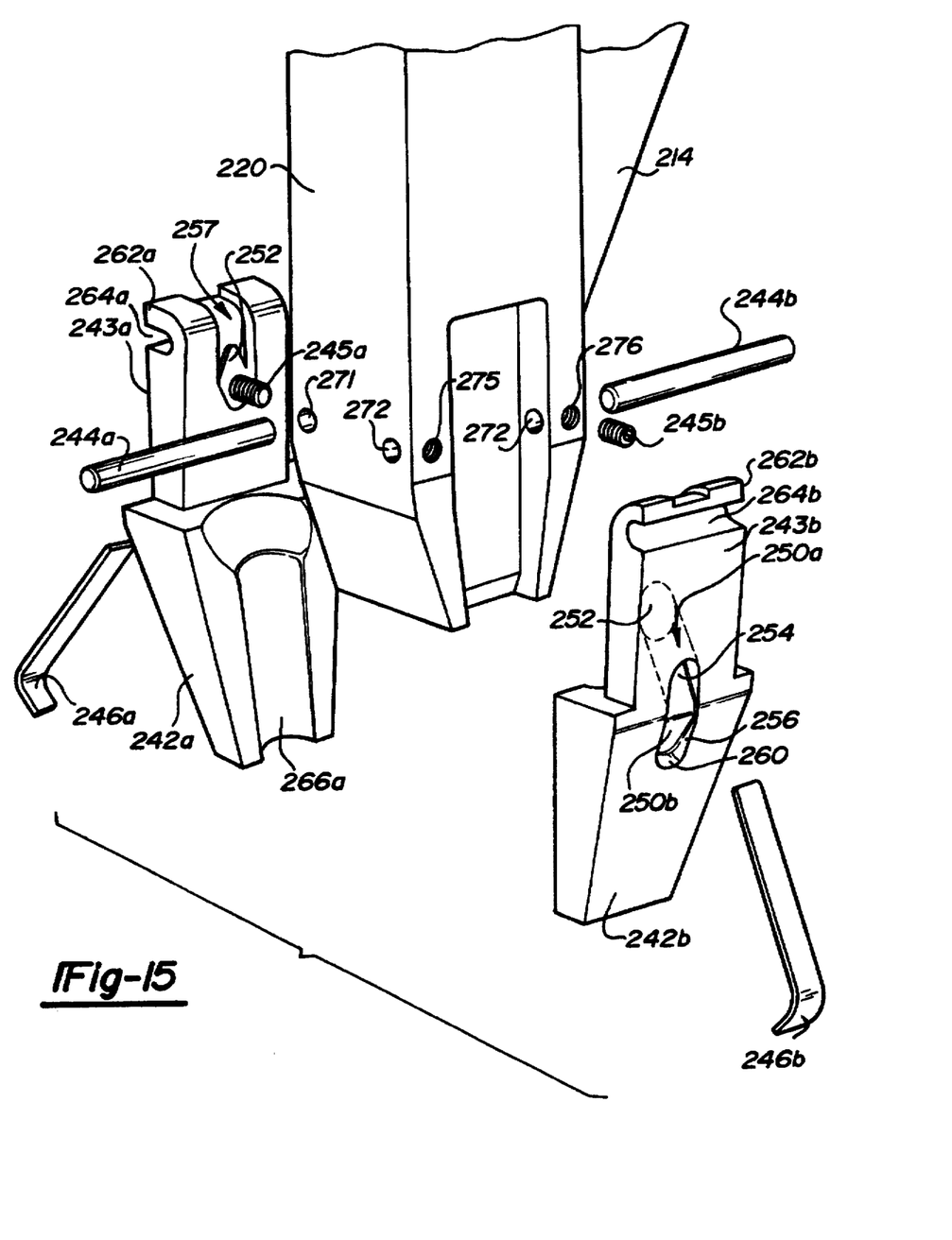
FIG. 15 is an exploded view of the nosepiece/receiver shown in FIG. 14.

Referring to FIGS. 14 and 15, it should be appreciated that the spring bores 250a, 250b and 251a, 251b are formed identically to the bores 150a, 150b. As shown in the quick change jaw 242b in FIG. 15, the spring bore 250a includes an inner aperture 252, and an upper outer aperture 254, while the spring bore 250b includes a lower outer aperture 256. The spring bore 250b also defines a spring seat 260 at its inner end. The spring bores 250b, 251b are formed in an identical, albeit mirror image, fashion. As shown on the quick change jaw 242a, a recessed channel 257 may also be formed on the inner surface of either jaw in addition to the inner aperture 252. The channel 257 allows the spring 246a to be deformed within the channel during outward pivotal movement of the jaw. Therefore, the jaw 242a may be pivoted further outwardly than the jaw 242b, which includes only the aperture 252, with the deformed spring only minimally hindering such rotation due to its seating within the recessed channel 257.

It should be appreciated that the jaws 242a, 242b are also pivotably connected to the body 220 in a manner identical to that of the single quick change jaw 142. Each jaw hinge 243a, 243b includes a jaw flange 262a, 262b. Jaw flanges 262a, 262b, in combination with the uppermost end of the jaw hinges 243a, 243b define U-shaped slots or channels 264a, 264b. Slots 264a, 264b pivotably receive the dowels 244a, 244b, thus allowing the jaws 242a, 242b to be pivotably mounted to the system body 220. The dowels 244a, 244b are inserted through bores 271, 272 in the jaw body 220 and are secured in place by the respective set screws 245a, 245b threadably inserted through threaded bores 275, 276. It is important to note that the jaw flanges 262a, 262b extend only slightly beyond the pivot point, so as to avoid interference as the jaws pivot about the dowels 244a, 244b. In this regard, the extent of the jaw flanges 262a, 262b need only be long enough to provide solid mechanical integrity for the hinge design.

It should be appreciated that the nosepiece/receiver according to the preferred embodiment of the present invention shown in FIGS. 14–15 provides the same benefits and advantages as does the above-described single jaw nosepiece/receiver. That is, the externally accessible jaw springs 246a, 246b allow for ease of spring replacement and maintenance. Further, the quick change jaw springs minimize the possibility of jaw member breakage when one, or both, of the jaws are over-pivoted in an outward direction, such as when a fastener becomes jammed in the nosepiece/receiver. In addition, neither tools nor skilled labor is required to replace worn quick change jaw springs, as the jaws need not be removed from the body for spring replacement. Further, the size of the quick change jaws 242a, 242b is substantially reduced in comparison to present quick change jaws, as the need for spring bores near the jaw hinge pivot point is eliminated. Thus, cost, size and weight of the jaws are reduced. In addition, as with the single quick change jaw, the quick change jaws 242a, 242b may be retrofit onto present double jaw nosepiece/receivers.

Figure 16:
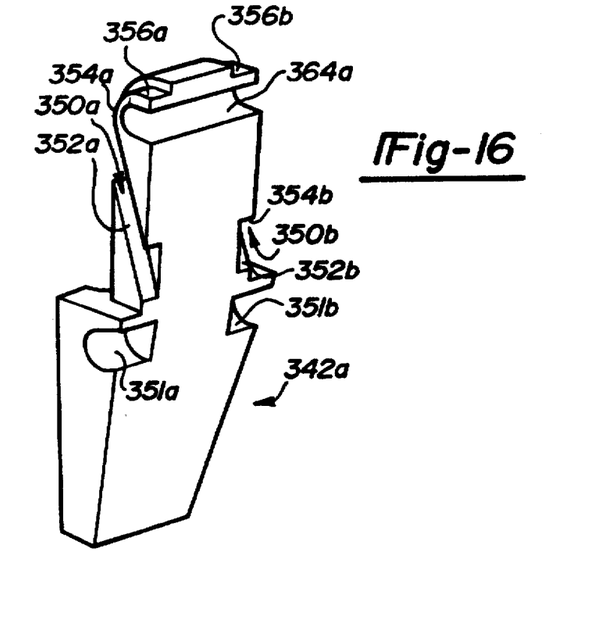
FIG. 16 is a perspective view of a jaw of a double jaw nosepiece/receiver according to yet another preferred embodiment of the present invention.

FIG. 16 illustrates another preferred embodiment of the jaw implemented in the double jaw nosepiece/receiver of the present invention generally at 342a. The jaw 342a differs from the jaw 242a in that the jaw 342a (with it being understood that the quick change jaw 342b has an identical, albeit mirror image construction), includes channels 350a, 350b and corresponding spring detentes 351a, 351b. The channel 350a is defined by a lower channel wall 352a and an upper channel wall 354a, while the channel 350b is defined by a lower channel wall 352b and an upper channel wall 354b. The upper channel walls 354a, 354b wrap around the periphery of the U-shaped slot 364a to define respective grooves 356a, 356b. Each corresponding set of channels 350a, 350b and spring detentes 351a, 351b receive quick change jaw springs such as those shown in FIGS. 10–13. Thus, in operation, as the jaw 342a is pivoted to a part releasing position and possibly even further outwardly, springs seated within the channels 350a, 350b and corresponding spring detentes 351a, 351b are deformed within the jaw channels 350a, 350b and within the grooves 356a, 356b around the pivot point of the U-shaped slot 364a, thereby allowing the jaw to pivot outwardly without the springs hindering such rotation.

Thus, it should be appreciated that the quick change jaw springs in the above-described embodiments may be retained within spring bores in any number of configurations without departing from the scope of the present invention, as long as the quick change jaw springs remain accessible and easily exchangeable from the exterior of the jaw or jaws.

While the above description constitutes the preferred embodiments of the present invention, it should be appreciated that the present invention may be modified without departing from the proper scope or fair meaning of the accompanying claims. Various other advantages of the present invention will become apparent to those skilled in the art after having the benefit of studying the foregoing text and drawings taken in conjunction with the following claims.

What is claimed is:

1. In a nosepiece/receiver assembly having a housing for receiving a part, a jaw mechanism removably mounted to said nosepiece/receiver assembly for pivotable movement, said jaw mechanism comprising:

at least one jaw member having a contoured surface for holding a part received by said nosepiece/receiver assembly when said jaw member is in a part holding position, said jaw member also being formed with channel means at one end thereof for enabling said jaw member to be pivotably secured to said assembly by a second member to allow said jaw member to pivot to a part releasing position, said channel means further allowing said jaw member to be pivoted beyond the part releasing position for removal of the jaw member from the assembly;

resilient biasing means for urging said jaw member into said part holding position, said resilient biasing means being in contact with both said housing of said nosepiece/receiver assembly and said jaw member with at least a portion of said resilient biasing means being external to said jaw member to facilitate manual replacement of said resilient biasing means.

2. The jaw mechanism of claim 1, wherein said jaw member includes passage means for enabling said resilient biasing means to be inserted through said jaw member in order to contact said nosepiece/receiver housing.

3. The jaw mechanism of claim 2, wherein said resilient biasing means is a leaf spring.

4. The jaw mechanism of claim 3, wherein said leaf spring includes a flange at one end for removably securing said leaf spring to said jaw member, and said jaw member includes a well for receiving said flange of said leaf spring.

5. The jaw mechanism of claim 2, further comprising groove means in cooperation with said passage means for receiving said biasing means upon rotation of said jaw member about said securing member.

6. The jaw mechanism of claim 2, wherein said resilient biasing means is a spring metal rod.

7. A part releasing device, comprising:

a housing having path means for receiving a part;

a jaw member pivotably secured to said housing in communication with said path means; and biasing means contacting said jaw member for urging said jaw member toward a part holding position, said biasing means being deflected when said jaw member is pivoted to a part releasing position, said biasing means being mounted such that said biasing means is removable from an outside surface of said jaw member;

said jaw member defining first and second passageways, said first passageway extending from an outside surface of said jaw member at least partially inwardly into said jaw member, said second passageway extending from the outside surface of said jaw member through said jaw member, said biasing means including a first end that extends into said first passageway, and a body, including a second end, that extends through said second passageway.

8. The part releasing device of claim 7, further including a second jaw member pivotably secured to said housing and in communication with said path means, and second biasing means contacting said second jaw member for urging said second jaw member toward said part holding position.

9. The part releasing device of claim 8, further comprising first and second passageways, said first passageway extending from an outside surface of said jaw member at least partially inwardly into said jaw member and said second passageway extending through said jaw member.

10. The part releasing device of claim 7, further comprising:
   third and fourth passageways, said third passageway extending from an outside surface of said second jaw member at least partially inwardly into said second jaw member and said fourth passageway extending through said second jaw member; and
   second biasing means having a first end retained within said third passageway.

11. The part releasing device of claim 10, wherein said second biasing means protrudes partially outwardly from the outer surface of said housing.

12. The part releasing device of claim 7, wherein said biasing means comprises a leaf spring having a first end retained within said first passageway.

13. The part releasing device of claim 7, further comprising:
   third and fourth passageways, said third passageway extending from an outside surface of said jaw member at least partially inwardly into said jaw member and said fourth passageway extending through said jaw member; and
   second biasing means having a first end retained within said third passageway.

14. The part releasing device of claim 13, wherein two of said passageways are formed below a pivot point of said jaw member and two of said passageways are formed around said pivot point.

15. The part releasing device of claim 7, wherein said biasing means comprises a leaf spring having a first end retained within said first passageway.

16. The part releasing device of claim 7, wherein said biasing means comprises a leaf spring.

17. The part releasing device of claim 7, wherein said jaw member is formed with a U-shaped end to enable said jaw member to pivot about a securing member of said housing.

18. In a nosepiece/receiver assembly having a housing for receiving a part, a jaw mechanism removably mounted to said nosepiece/receiver assembly for pivotable movement, said jaw mechanism comprising:
   at least one jaw member having a contoured surface for holding a part received by said nosepiece/receiver assembly when said jaw member is in a part holding position, said jaw member also being formed with channel means at one end thereof from enabling said jaw member to pivot about a securing member of said nosepiece/receiver assembly to a part releasing position, said jaw member being pivotable about the securing member past said part releasing position for removal of said jaw member from the assembly; and
   positioning means operatively connected to said jaw member for positioning said part before said jaw is pivoted to said part releasing position.

19. In a nosepiece/receiver assembly having a housing for receiving a part, a jaw mechanism removably mounted to said nosepiece/receiver assembly for pivotable movement, said jaw mechanism comprising:
   at least one jaw member having a contoured surface for holding a part received by said nosepiece/receiver assembly when said jaw member is in a part holding position, said jaw member also being formed with channel means at one end thereof for enabling said jaw member to pivot about a securing member of said nosepiece/receiver assembly to a part releasing position;
   resilient biasing means for urging said jaw member into said part holding position, said resilient biasing means being in contact with both said housing of said nosepiece/receiver assembly and said jaw member with at least a portion of said resilient biasing means being external to said jaw member; and
   a magnet positioned within said jaw member to facilitate positioning of said part.

20. In a part positioning system comprising a main housing, a part feeder operatively attached to said housing for supplying a part to said housing, a jaw member pivotably mounted about pivot means secured to said housing, and externally accessible biasing means for urging said jaw mechanism toward a part holding position, a method of removing said jaw member from said housing, comprising the steps of:
   removing said externally accessible biasing means from engagement with said jaw mechanism;
   rotating said jaw mechanism past a part releasing position; and
   removing said jaw member from engagement with said pivot means so that the pivot means no longer secures the jaw member to the housing.

21. The method of claim 20, wherein said step of removing said biasing means comprises removing said biasing means while said jaw member remains in said part holding position.

22. In a nosepiece/receiver assembly having a housing for receiving a part, a jaw mechanism removably mounted to said nosepiece/receiver assembly for pivotable movement, said jaw mechanism comprising:
   at least one jaw member having a contoured surface for holding a part received by said nosepiece/receiver assembly when said jaw member is in a part holding position, said jaw member also being formed with channel means at one end thereof for enabling said jaw member to pivot about a securing member of said nosepiece/receiver assembly to a part releasing position, said jaw member being pivotable about the securing member past said part releasing position for removal thereof from the assembly; and
   a magnet operatively connected to said jaw member for positioning said part before said jaw is pivoted to said part releasing position.

* * * * *